US011125603B2

(12) United States Patent
Bregani et al.

(10) Patent No.: US 11,125,603 B2
(45) Date of Patent: Sep. 21, 2021

(54) FAULT DETECTION SYSTEM AND METHOD FOR LIQUID LEVEL SENSING DEVICE

(71) Applicant: PRATT & WHITNEY CANADA CORP., Longueuil (CA)

(72) Inventors: Benjamin Bregani, Montreal (CA); Sean McCarthy, Beaconsfield (CA); Nicolas Renard, St-Lambert (CA); Andrew Ghattas, La Prairie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 167 days.

(21) Appl. No.: 16/448,893

(22) Filed: Jun. 21, 2019

(65) Prior Publication Data

US 2020/0355543 A1 Nov. 12, 2020

Related U.S. Application Data

(60) Provisional application No. 62/846,128, filed on May 10, 2019.

(51) Int. Cl.
*G01F 25/00* (2006.01)
*G01M 15/14* (2006.01)
*F01M 11/12* (2006.01)
*G01F 23/74* (2006.01)

(52) U.S. Cl.
CPC ...... *G01F 25/0076* (2013.01); *G01F 25/0069* (2013.01); *G01M 15/14* (2013.01)

(58) Field of Classification Search
CPC .. G01F 25/0076; G01F 25/0069; G01F 23/74; G01F 25/00; G01F 25/0061; G01M 15/14; F01M 11/12
See application file for complete search history.

(56) References Cited

U.S. PATENT DOCUMENTS

| 3,614,887 | A | | 10/1971 | Douglas |
| 5,723,870 | A | * | 3/1998 | Crowne ............... B64D 37/00 250/221 |
| 7,421,895 | B1 | | 9/2008 | Caldwell |
| 2003/0037613 | A1 | * | 2/2003 | Mulrooney ........... G01F 23/284 73/323 |
| 2006/0065040 | A1 | | 3/2006 | Grunwald et al. |
| 2009/0031799 | A1 | | 2/2009 | Benway et al. |

(Continued)

FOREIGN PATENT DOCUMENTS

WO 20130037865 3/2013

OTHER PUBLICATIONS

Extended European Search Report dated Sep. 30, 2020 in counterpart EP application.

*Primary Examiner* — Peter J Macchiarolo
*Assistant Examiner* — Anthony W Megna Fuentes
(74) *Attorney, Agent, or Firm* — Norton Rose Fulbright Canada LLP (57) ABSTRACT

A method and system are described for detecting a fault of a fluid level sensing device associated with an aircraft engine, the fluid level sensing device arranged to measure a variance in a fluid level. The method comprises triggering a timer, while the timer is running, receiving a measurement indicative of the fluid level from the fluid level sensing device, resetting the timer when at least one timer-reset condition has been met, and outputting a fault signal when the timer reaches a timer threshold.

21 Claims, 9 Drawing Sheets

(56) References Cited

U.S. PATENT DOCUMENTS

| | | |
|---|---|---|
| 2013/0032217 A1 | 2/2013 | Pesek et al. |
| 2013/0218399 A1 | 8/2013 | Demaison et al. |
| 2015/0143897 A1* | 5/2015 | Cummings ............. F04D 13/12 73/168 |

* cited by examiner

FAULT DETECTION SYSTEM AND METHOD FOR LIQUID LEVEL SENSING DEVICE

CROSS-REFERENCE TO RELATED APPLICATIONS

The present application claims priority of U.S. Provisional Patent Application No. 62/846,128 filed on May 10, 2019, the contents of which are hereby incorporated by reference.

TECHNICAL FIELD

The present disclosure relates generally to fault detection for liquid level sensing devices associated with aircraft engines.

BACKGROUND OF THE ART

Liquid level sensing devices are used to monitor a level of liquid in a container, such as an engine oil tank. One example of a liquid level sensing device is a resistive-type sensor with multiple reed switches and varying resistance values for each reed switch.

In some aircraft, the liquid level sensing device indicates when the oil level in the aircraft engine has reached a level that requires oil to be added in the tank prior to running the engine. The liquid level sensing device may also be used to determine dispatchability of the aircraft. The correctness of the liquid level sensing device is therefore important and in some cases, critical, and improvements are needed.

SUMMARY

In accordance with a broad aspect, there is provided a method for detecting a fault of a fluid level sensing device associated with an aircraft engine, the fluid level sensing device arranged to measure a variance in a fluid level. The method comprises triggering a timer, while the timer is running, receiving a measurement indicative of the fluid level from the fluid level sensing device, resetting the timer when at least one timer-reset condition has been met, and outputting a fault signal when the timer reaches a timer threshold.

In accordance with another broad aspect, there is provided a system for detecting a fault of a fluid level sensing device associated with an aircraft engine, the fluid level sensing device arranged to measure a variance in a fluid level. The system comprises at least one processing unit and at least one non-transitory computer-readable memory having stored thereon program instructions. The program instructions are executable by the at least one processing unit for triggering a timer, while the timer is running, receiving a measurement indicative of the fluid level from the fluid level sensing device, resetting the timer when at least one timer-reset condition has been met, and outputting a fault signal when the timer reaches a timer threshold.

Features of the systems, devices, and methods described herein may be used in various combinations, in accordance with the embodiments described herein.

BRIEF DESCRIPTION OF THE DRAWINGS

Reference is now made to the accompanying figures in which:

FIGS. 4A-4D are graphs illustrating example embodiments of fluid consumption over time, in accordance with an illustrative embodiment;

It will be noted that throughout the appended drawings, like features are identified by like reference numerals.

DETAILED DESCRIPTION

There is described herein a method and system for fault detection of a fluid level sensing device associated with an engine, such as an aircraft engine or an engine used in an industrial setting. In some embodiments, the fluid level sensing device is an oil sensing system. Although an oil sensing system will be used throughout the disclosure as an example, other types of fluids, such as fuel and water, are also applicable.

Figure 1:
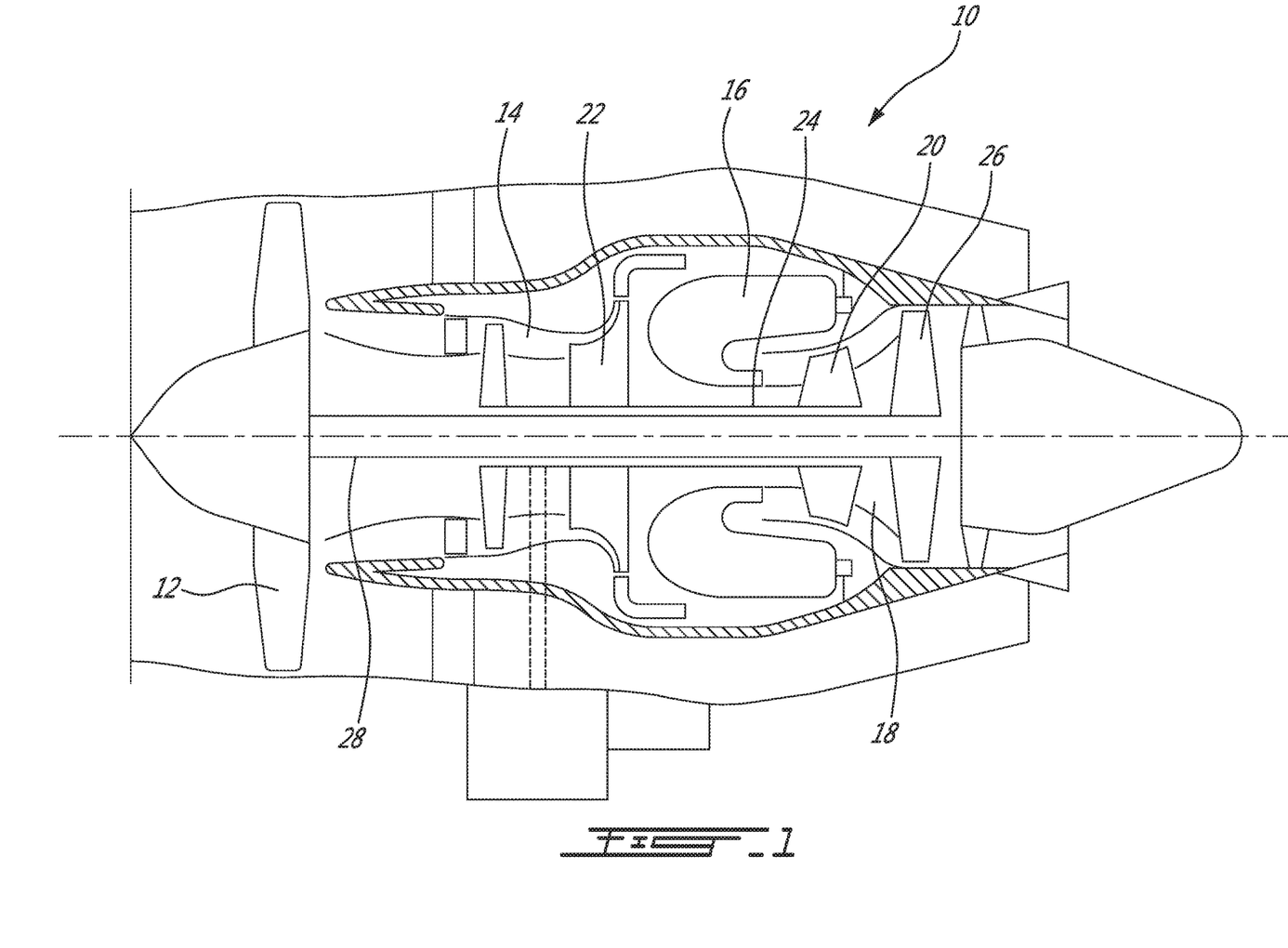
FIG. 1 is a schematic cross-sectional view of a gas turbine engine, in accordance with an illustrative embodiment.

The engine may be a gas turbine engine, such as a turbofan engine, a turboshaft engine, a turboprop engine, and the like. FIG. 1 illustrates an example gas turbine engine 10 of a type provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although a gas turbine engine 10 is illustrated, the system and method for fault detection may apply to any other suitable engine. In particular, the method and system for fault detection may apply to any type of engine (as well as any application and/or industry) which uses a container of fluid that is emptied and replenished regularly and for which it is desirable to know the level of fluid as well as the health of a fluid level sensing device used to monitor the level of fluid. For example, diesel engines, typical car engines (internal combustion engine), or the like, may apply.

Figure 2:
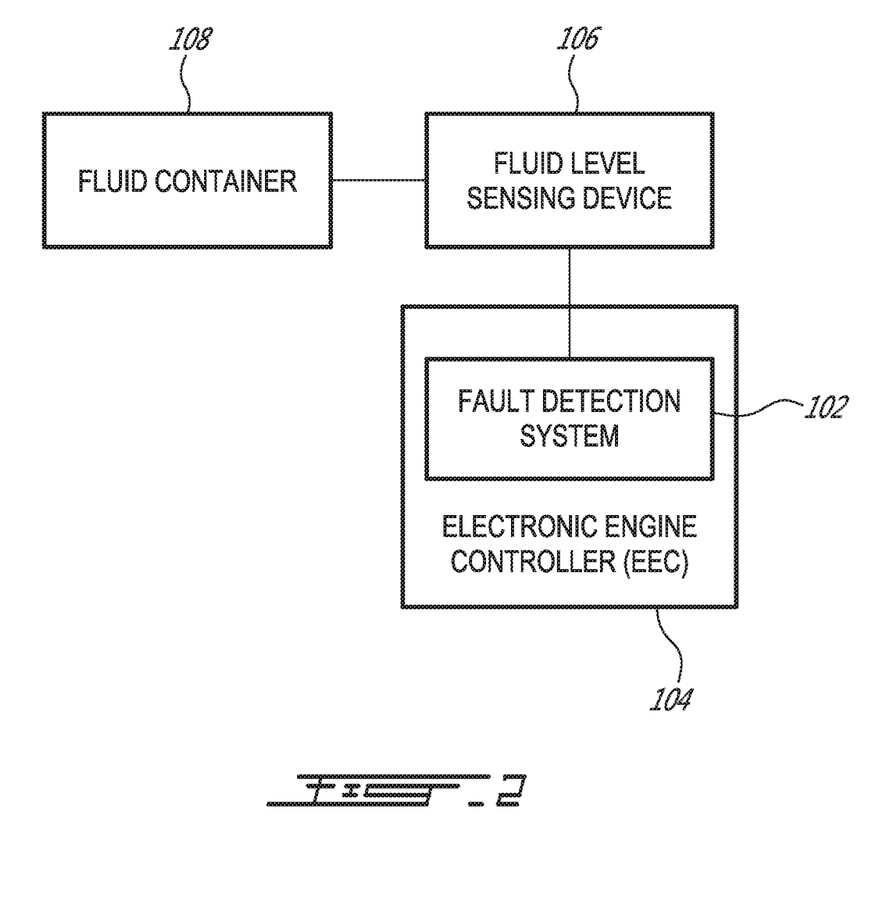
FIG. 2 is a block diagram of a fault detection system for a liquid level sensing device, in accordance with an illustrative embodiment.

Referring to FIG. 2, there is illustrated a fault detection system 102, which is illustratively part of an Electronic Engine Controller (EEC) 104. The EEC 104 may be part of a Full Authority Digital Engine Control (FADEC), which is used to control the operation and performance of the engine 10. The fault detection system 102 is connected to a fluid level sensing device 106, which may be used to monitor any level of fluid (e.g. water, oil, or the like) in any suitable vessel or container 108 that defines a volume of the fluid. In one embodiment, the fluid level sensing device 106 monitors a level of oil in an oil tank of the engine 10.

Figure 3:
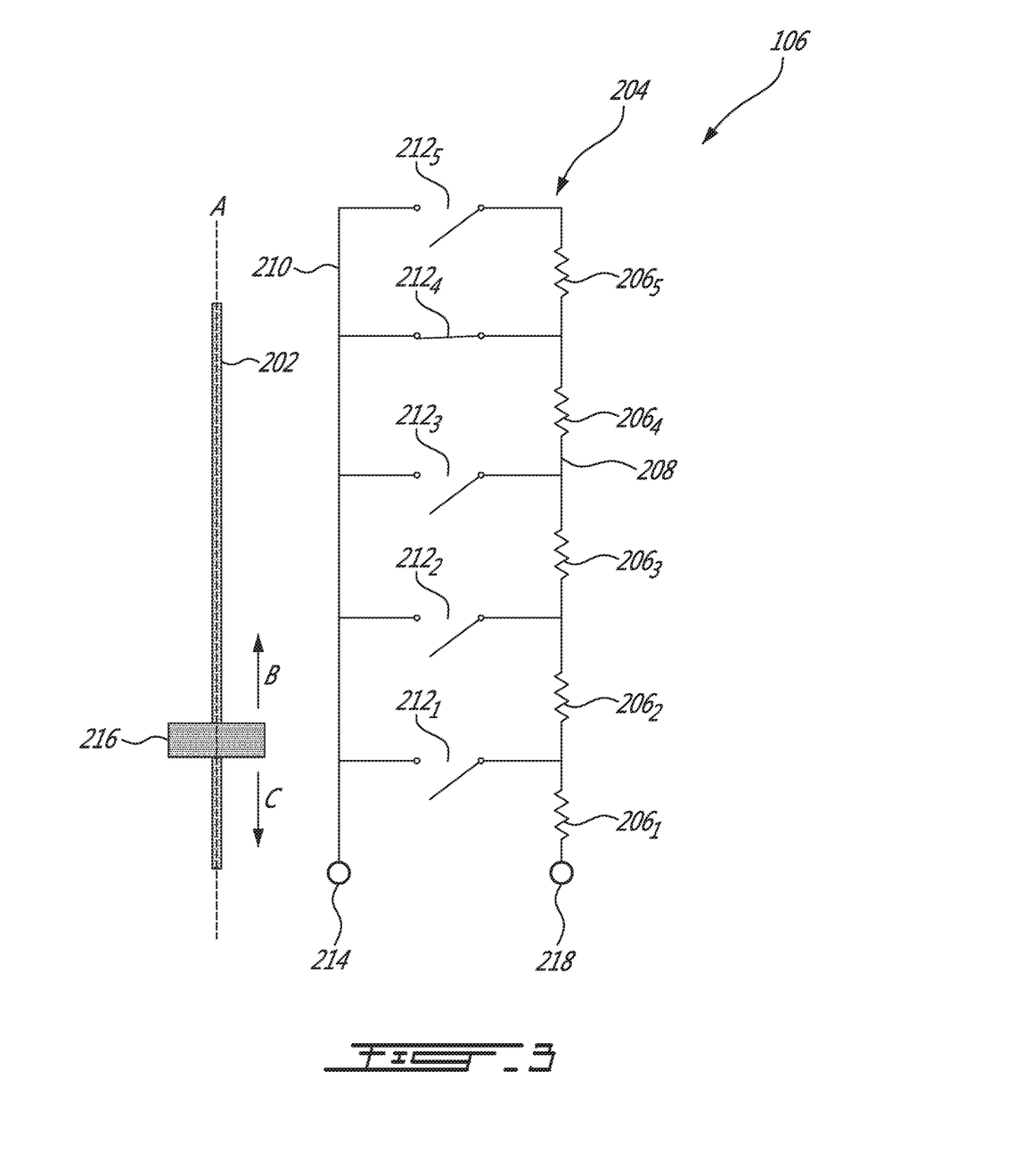
FIG. 3 is a schematic of an example fluid level sensing device, in accordance with an illustrative embodiment.

Referring to FIG. 3 in addition to FIG. 2, in one embodiment, the fluid level sensing device 106 is a resistive-type sensor, such as a reed switch level sensor. The fluid level sensing device 106 comprises a stem 202 that extends along an axis A and is configured to be positioned in a fluid contained in the fluid container 108 (e.g. in the oil contained in the engine's oil tank). An elongated electrical circuit is enclosed in the stem 202. The electrical circuit comprises a resistor line 204 with a number (N) of resistors $206_1$, $206_2, \ldots, 206_N$, which are vertically aligned along the axis A and serially connected by wires 208. The electrical circuit also comprises a wire 210 that connects to the resistors $206_1, 206_2, \ldots, 206_N$ through magnetic switches $212_1, 212_2, \ldots, 212_N$ (e.g. reed switches). The magnetic switches $212_1, 212_2, \ldots, 212_N$ are illustratively each actuatable between an open and a closed position (or state) and are nominally open. One end of each switch $212_1, 212_2, \ldots, 212_N$ is connected to a resistor $206_1, 206_2, \ldots, 206_N$ and another end of each switch $212_1, 212_2, \ldots, 212_N$ is connected to a common node (e.g. terminal 214 of wire 210). It should be understood that, although the fluid level sensing device 106 is illustrated in FIG. 3 as comprising N=5 resistors and N=5 switches, any other suitable number of resistors and switches may apply depending on the characteristics of the engine 10.

A floating device 216 (e.g. a ring float) encircles the stem 202 and is configured to move vertically (i.e. rise or lower) along the axis A with the fluid level in the fluid container 108. In particular, as the fluid container 108 (e.g. the oil tank) is replenished (e.g. upon engine shutdown) and the level of fluid in the fluid container 108 (e.g. the level of oil in the engine's oil tank) increases, the floating device 216 moves up along the axis A (in the direction of arrow B). As the fluid container 108 is drained (e.g. upon engine operation) and the level of fluid in the fluid container 108 decreases, the floating device 216 moves down along the axis A (in the direction of arrow C).

The floating device 216 carries a magnetic element, such as one or more permanent magnets. When the floating device 216 moves adjacent to a given one of the switches $212_1, 212_2, \ldots, 212_N$, the given switch $212_1, 212_2, \ldots,$ or $212_N$ is activated (i.e. closes) under the magnetic force generated by the magnetic element, thereby completing the circuit between a terminal 218 of the resistor line 204 and terminal 214 and providing a path for electrical current to travel through the applicable resistors $206_1, 206_2, \ldots, 206_N$. When the floating device 216 moves away from the given switch $212_1, 212_2, \ldots,$ or $212_N$, the switch $212_1, 212_2, \ldots,$ or $212_N$ is deactivated (i.e. opens). On a nominally operating fluid level sensing device 106, only one switch $212_1, 212_2, \ldots,$ or $212_N$ is activated at any given time. Thus, as the floating device 216 is moved upwardly and downwardly, different ones of the switches $212_1, 212_2, \ldots, 212_N$ are closed by the proximity of the magnetic element, thereby providing a complete circuit through a different number of resistors $206_1, 206_2, \ldots, 206_N$ to provide a voltage value. Although the terminals 214, 218 are shown to be at a bottom end of the device 106, they may be provided at a top end.

The voltage value(s) measured between the terminal 218 of the resistor line 204 and the wire 210 (e.g. the terminal 214 thereof) can be obtained at the EEC 104 (e.g. via suitable signal lines, not shown) and used to detect the fluid level (e.g. by converting the voltage value(s) into information related to the position of the floating device 216). In one embodiment, the EEC 104 is connected to the fuel level sensing device 106 at both terminals 214 and 218 and provides a voltage (having a given value) at terminal 218.

When the floating device 216 causes a given switch (e.g. the switch $212_2$, as illustrated in FIG. 3) to close, electrical current in turn flows from terminal 218 and passes through the electrical circuit completed by activation of the given switch (e.g. passes through resistors $206_5, 206_4, 206_3, 206_2$) before travelling across the given switch towards terminal 214. The EEC 104 thus receives, from the fluid level sensing device 106, a sensor reading comprising voltage measurements and determines the liquid level accordingly. As the fluid level varies, the EEC 104 can detect step changes in voltage resulting from successive actuation (i.e. selective activation and deactivation) of the switches $212_1, 212_2, \ldots, 212_N$. In one embodiment, the lowest voltage is measured at the EEC 104 when the fluid container 108 is full and the highest voltage is measured at the EEC 104 when the fluid container 108 is empty. Based on knowledge of the voltage provided by the EEC 104 at terminal 218, of the voltage received by the EEC 104 at terminal 214, and of the difference between the provided and the received voltages, the EEC 104 can determine the resistance that is present in the electrical circuit. Once the resistance is obtained, the EEC 104 is then able to identify the actuated switch and the level of fluid accordingly.

In the example illustrated in FIG. 3, each resistor $206_1, 206_2, \ldots, 206_N$ has a resistance of 100 Ohms. When the floating device 216 is positioned adjacent switch $212_4$, the switch $212_4$ activates (i.e. closes), as shown in FIG. 3, and the resulting voltage read by the EEC 104 would correspond to a resistance of about 400 Ohms. When the fluid level decreases, resulting in the floating device 216 falling to a position adjacent the switch $212_3$, the voltage read by the EEC 104 would correspond to a resistance of about 300 Ohms. As the floating device 216 further lowers (i.e. as the fluid container 108 empties), the floating device 216 successively passes nearby the switches $212_2$ and $212_1$, resulting in voltage measurements which correspond to resistances of about 200 Ohms and about 100 Ohms. Similarly, if the fluid container 108 is empty and is then filled, the EEC 104 successively measures voltage values corresponding to resistance values of about 100 Ohms, 200 Ohms, 300 Ohms, 400 Ohms, and 500 Ohms as the switches $212_1, 212_2, \ldots, 212_N$ are successively closed (and opened) as the floating device 216 rises. As used herein, the term about (a given resistance value) should be understood to mean substantially equal to (the given resistance value), within a predetermined tolerance.

Thus, for a normally operating fluid level sensing device 106, the switches $212_1, 212_2, \ldots, 212_N$ are successively activated and deactivated with the changing fluid level. The sensor reading obtained from the fluid level sensing device 106 can then be used by the fault detection system 102 of FIG. 2 to diagnose a fault or failure of the fluid level sensing device 106.

It should be understood that, although the fluid level sensing device 106 is described and illustrated herein as a resistive-type sensor comprising multiple reed switches $212_1, 212_2, \ldots,$ or $212_N$ (with varying resistance values for each reed switch) and a floating device 216, any suitable (e.g. non-resistive) fluid level sensing device may apply. For example, each resistor $206_1, 206_2, \ldots, 206_N$ may be replaced by a battery supplying a given voltage (e.g. 10 volts) and the terminal 218 may be disconnected from the EEC 104. As the floating device 216 moves upwardly and downwardly, different ones of the switches $212_1, 212_2, \ldots, 212_N$ are closed by the proximity of the magnetic element, thereby providing a complete circuit through a different number of batteries to provide a voltage value. For example, when the floating device 216 rises and causes switch $212_5$ to close, this in turn closes the electrical circuit and a voltage of 10 volts (provided by the battery replacing resistor $206_5$) is then detected by the EEC 104 at terminal 214. When the floating device 216 lowers and causes switch $212_4$ to close, switch $212_5$ returns to its open state and the batteries replacing resistors $206_4$ and $206_5$ are then connected in series, thus causing a voltage of 20 volts (10 volts +10 volts) to be detected at terminal 214. In another example, the fluid level sensing device may be a capacitive fluid level sensor, whereby a parallel plate capacitor is immersed in the fluid container 108. As the fluid level changes, the amount of dielectric material between the plates changes, which causes the capacitance to change as well. A second pair of capacitive plates in the fluid container 108 may be used as a reference. Other embodiments may apply.

In some embodiments, the fluid level sensing device 106 provides a digital measurement indicative of the fluid level in the fluid container 108. In other embodiments, the fluid level sensing device 106 provides an analog measurement indicative of the fluid level in the fluid container 108. In some embodiments, an analog to digital conversion is performed on the measurement.

In some embodiments, each switch $212_1$, $212_2$, ..., $212_N$ corresponds to a fluid level when it gets activated. Each switch can be translated into a volume of fluid remaining in the fluid container 108, that translation being a function of sensor granularity and a design of the fluid container 108. The volume of fluid remaining can itself be translated into a time of operation left, as a function of fluid consumption rate.

Figure 4A:
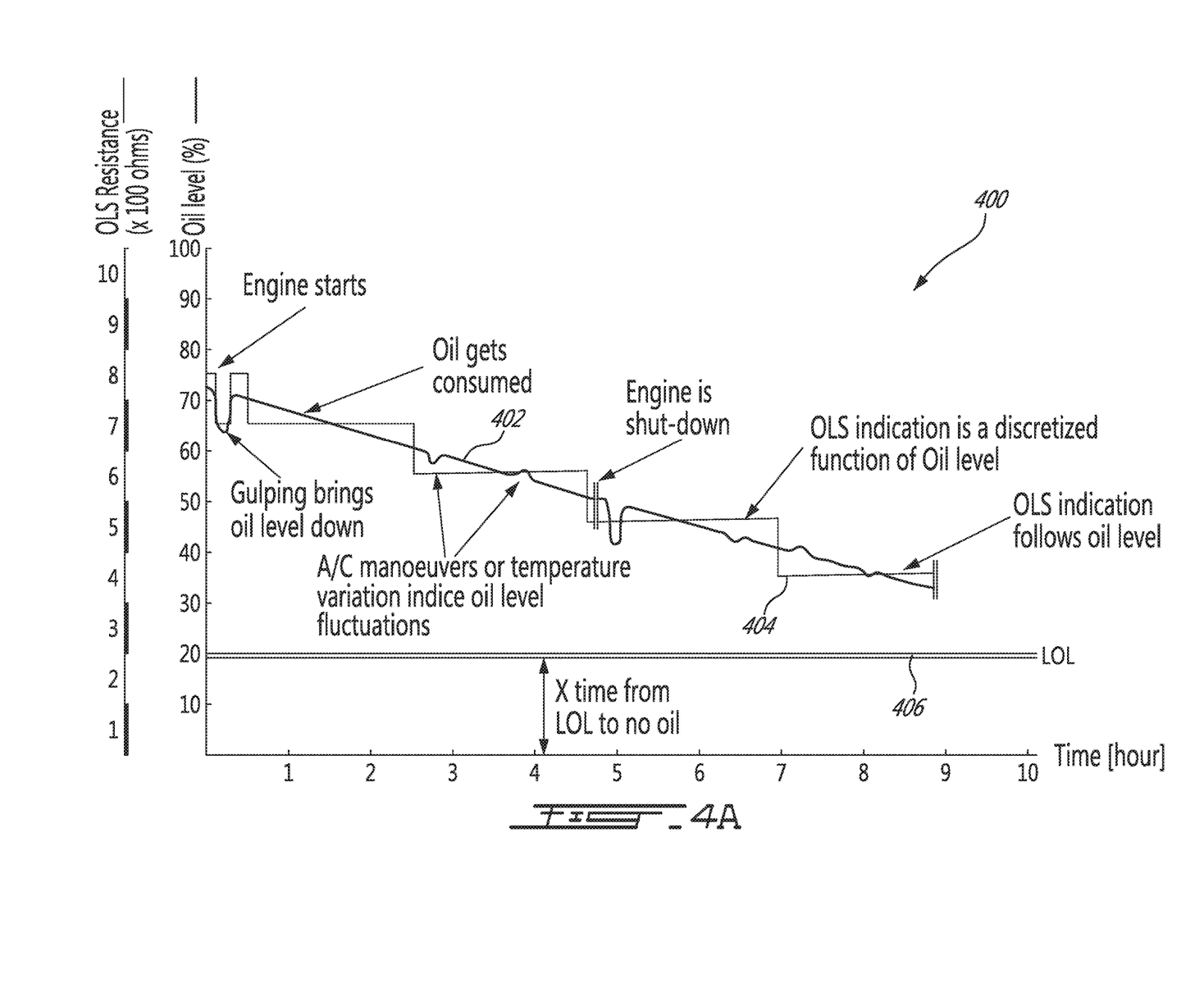

Referring to FIG. 4A, there is illustrated a graph 400 showing at 402 an example progression of the actual fluid level in the fluid container 108 as it is consumed during engine operation over time. Overlaid on the actual fluid level 402 is the sensor reading at 404 as received from the fluid level sensing device 106, as the floating device 216 successively activates switches $212_1$, $212_2$, ..., $212_N$ during normal operation of the fluid level sensing device 106. The plurality of switches $212_1$, $212_2$, ..., $212_N$ are illustratively represented as 1 to 10 along the vertical axis of the graph 400, with switch $212_1$ represented by 1, $212_2$ represented by 2, etc. In the example, the sensor reading 404 is a discretized function of the fluid level and therefore shown as a step function. When the fluid level sensing device 106 is operating properly, the sensor reading 404 generally follows the actual fluid level 402.

Various factors can affect the actual fluid level 402, such as but not limited to gulping, fluid consumption, fluid temperature variations, and aircraft attitudes. Gulping refers to the fluid entering and exiting certain cavities of the engine as a function of engine geometry. Aircraft attitudes may affect the center of gravity of the fluid container 108, thus temporarily changing the reading of the fluid level sensing device 106 during certain aircraft maneuvers.

Figure 4B:
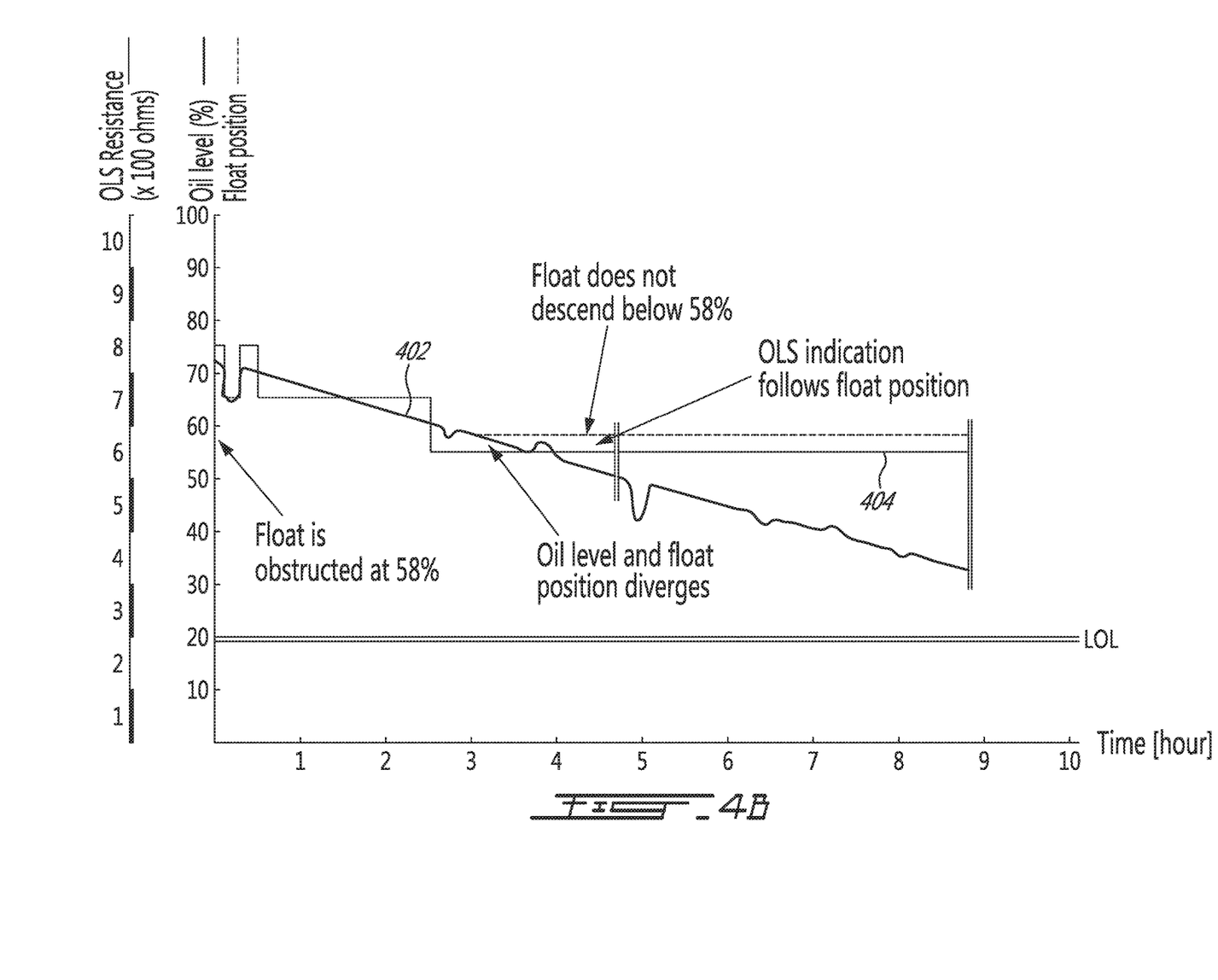

If the floating device 216 is obstructed from descending due to an obstacle, the actual fluid level 402 may diverge from the sensor reading 404, as illustrated in FIG. 4B. As shown, the floating device 216 is obstructed at about 58% of the fluid level, which is reached a little before three hours of engine operation. At this point, the sensor reading 404 remains constant despite the actual fluid level 402 continuing to decrease.

In accordance with some embodiments, the fault detection system 102 is configured to detect the divergence of the sensor reading 404 (or the position of the floating device 216) with the actual fluid level 402 in the fluid container 108.

More generally, the fault detection system 102 is configured to detect a fault of the fluid level sensing device 106 associated with an aircraft engine, such as engine 10. In addition to an obstruction to the floating device 216, the fault detection system 102 may also detect any fault resulting in an inaccurate sensor reading, such as but not limited to a broken open switch, a damaged switch, a demagnetized floating device 216, and the like.

A timer is used to ensure that the sensor reading 404 continues to decrease over time, as per the normal operation of the fluid level sensing device 106. The timer is triggered at time T=0, for example when the engine is first turned on or when the fluid container 108 is filled to a given level. The initial starting of the timer may be manual or automated as a function of one or more timer-starting conditions. While the timer is running, the sensor reading is monitored. If the timer reaches a timer threshold before a timer-reset condition is met, a fault signal is output indicative of an issue. The timer is reset every time a timer-reset condition is met.

In some embodiments, the timer-reset condition corresponds to a decrease in the fluid level as represented by the sensor reading, by a predetermined amount. For example, if the sensor reading is analog, having the fluid level decrease by a given percentage or a given volume may cause the timer to be reset. The amount or percentage used to cause the timer to be reset may be determined as a function of various factors.

In the case of a discretized sensor reading, the timer-reset condition may correspond to the reading having decreased by one or more units.

When the sensor reading is indicative of a given switch being active, the timer-reset condition may be the activation of a new switch indicative of a lower fluid level than a previous switch. For example, and with reference to FIG. 3, if the timer is started when switch $212_3$ is active and switch $212_2$ gets activated, this may cause the timer to be reset as it is indicative of the floating device 216 moving downwards along the A axis. In some embodiments, two or more switch levels are required to cause the timer to be reset. For example, a jump from switch $212_5$ to switch $212_3$ if two switch levels are used, or a jump from switch $212_5$ to switch $212_2$ if three switch levels are used, may cause the timer to be reset. The number of switch levels may be selected as a function of sensor granularity and/or other factors.

In some embodiments, the timer-reset condition corresponds to the fluid level reaching a low-fluid threshold and an alert regarding low fluid is issued and/or confirmed. Referring to FIG. 4A, an example low-fluid level threshold is shown at 406. When the sensor reading 404 indicates that the fluid level has reached the low-fluid level 406, an alert or warning is issued, either to the cockpit or to another system of the aircraft and/or engine. This action triggers a maintenance flag for the fluid container 108 to be refilled. Since the aircraft will not be dispatched until the maintenance flag is addressed, and the maintenance flag will only be removed if the fluid container 108 is refilled, the timer may be reset.

In some embodiments, the timer-reset condition comprises a manual request to reset the timer, for example through a maintenance panel or from an input in the cockpit.

In some embodiments, the timer-reset condition comprises an engine restart combined with a higher fluid level reading than a previous fluid level reading. For example, if the fluid level at the time of engine shut down is read from the sensor reading to be at switch $206_2$ and the fluid level at the time of the next engine start-up is read to be at switch $206_5$, then the timer is reset. This is to account for a refilling of the fluid container 108 when the engine is shut down without a manual request to restart the timer or the resetting of a maintenance flag.

In some embodiments, the fault detection system 102 is configured to recognize a plurality of timer-reset conditions and the timer will reset when any one of the timer-reset conditions is met.

Figure 4C:
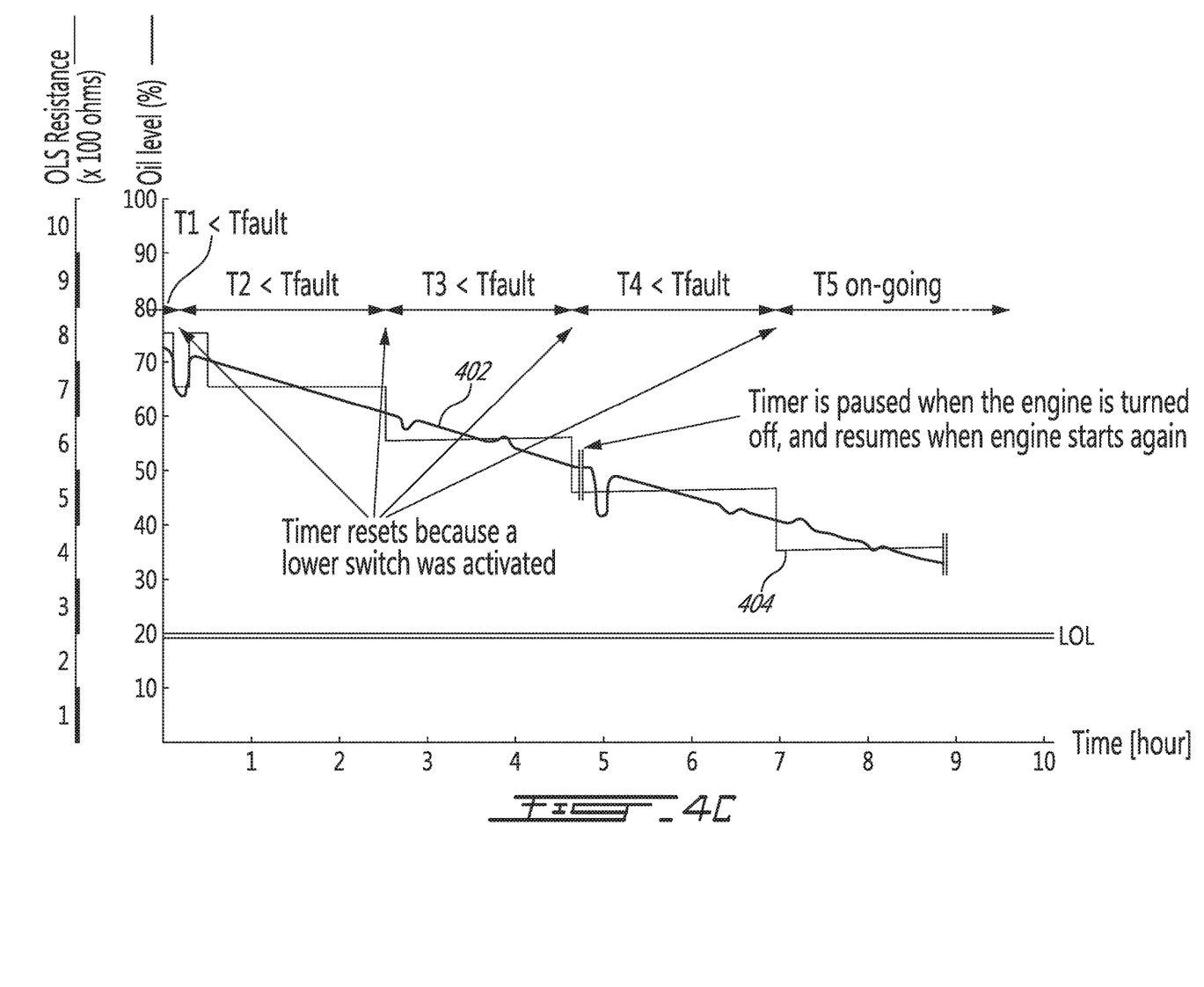

A specific and non-limiting example is illustrated in FIG. 4C. In this example, the timer-reset condition corresponds to one switch level. When the engine is started at time T=0, a gulping effect causes the sensor reading to go from switch 8 to switch 7, triggering a reset of the timer. As the engine operates, the fluid gets consumed and switch 6 gets activated, causing the timer to be reset again.

In some embodiments, the timer is paused when the engine is turned off and resumes when the engine starts again. The EEC 104 may record the last sensor reading (or last active switch) at the time of engine shutdown. The fault detection system 102 may compare the last sensor reading (or last active switch) to a current sensor reading (or current active switch) when the engine starts up again. The timer would only be reset upon engine restart if the current sensor reading was greater than the last sensor reading.

The timer-threshold is defined such that the fault detection system 102 triggers a fault signal indicating that the fluid level sensing device 106 may be malfunctioning. The timer-threshold may be application specific and set as a function of various parameters. In some embodiments, the timer-threshold is set to be greater than the expected time to reach a next lower level, which is a function of sensor granularity and fluid consumption rate:

$$T_f \geq Z$$

$T_f$ is the timer threshold and Z is the time taken to reach a next lower level of fluid. Z may be due to acceptable production variations and other environmental factors.

In some embodiments, the timer-threshold is set to a value that is less than or equal to the time it takes to consume the fluid left in the fluid container 108 when the low-fluid level 406 is reached:

$$T_f \leq X$$

X is the time from low fluid level to no fluid, assuming a failure free system (i.e. without any rupture of the fluid system or some other failure cause that would cause rapid loss of fluid). X may be set as a function of acceptable production variation and other environmental factors. In some embodiments, X may be set as a function of a fluid consumption rate of a given engine. For example, some engine types may consume fluid at a faster rate than other engine types. In some cases, engine wear may also cause a variance in fluid consumption rate from one engine to another. Using the time from low fluid level to no fluid to set the timer-threshold prevents a scenario where the engine would run out of fluid in-flight, should the malfunction occur shortly before the low-fluid level 406 is reached but the time left on the timer to reach the timer threshold is greater than the time it takes to consume the remaining fluid in the fluid container 108.

In some embodiments, the timer-threshold is set to take into account a longest mission duration:

$$T_f \leq X - LM \text{ (or } T_f + LM \leq X)$$

Where LM is the time of the longest mission. This would ensure that a pilot is advised prior to a critical flight that the fluid level sensing device 106 is not reliable.

In some embodiments, the timer-threshold is set to take into account the fluid remaining below the last activated level:

$$T_f \leq X - LM + Y$$

Where Y is the time remaining until the next level is reached. An example is illustrated in FIG. 4D, where a longest mission duration (LM) is 2.5 hours, a time from low fluid level to no fluid (X) is 5 hours, and the time remaining until the next switch is activated (Y) is 2.5 hours. The timer-threshold is therefore set to 5.5 hours. In this scenario, a fault is detected before the last mission is started.

In some embodiments, the timer-threshold is a fixed value that remains constant until it is changed by an operator. In some embodiments, the timer-threshold can vary as a function of the sensor reading. For example, the timer-threshold may be greater when the sensor reading indicates that the fluid container 108 is filled at greater than 50% capacity and lower when the sensor reading indicates that the fluid container 108 is filled at less than 50% capacity. In another example, the timer-threshold may vary as a function of which switch is currently active, or which switch caused a reset to the timer. A switch associated with a higher fluid level would have a higher timer-threshold than a switch associated with a lower fluid level. Other embodiments may also apply depending on the practical implementation.

Figure 5:
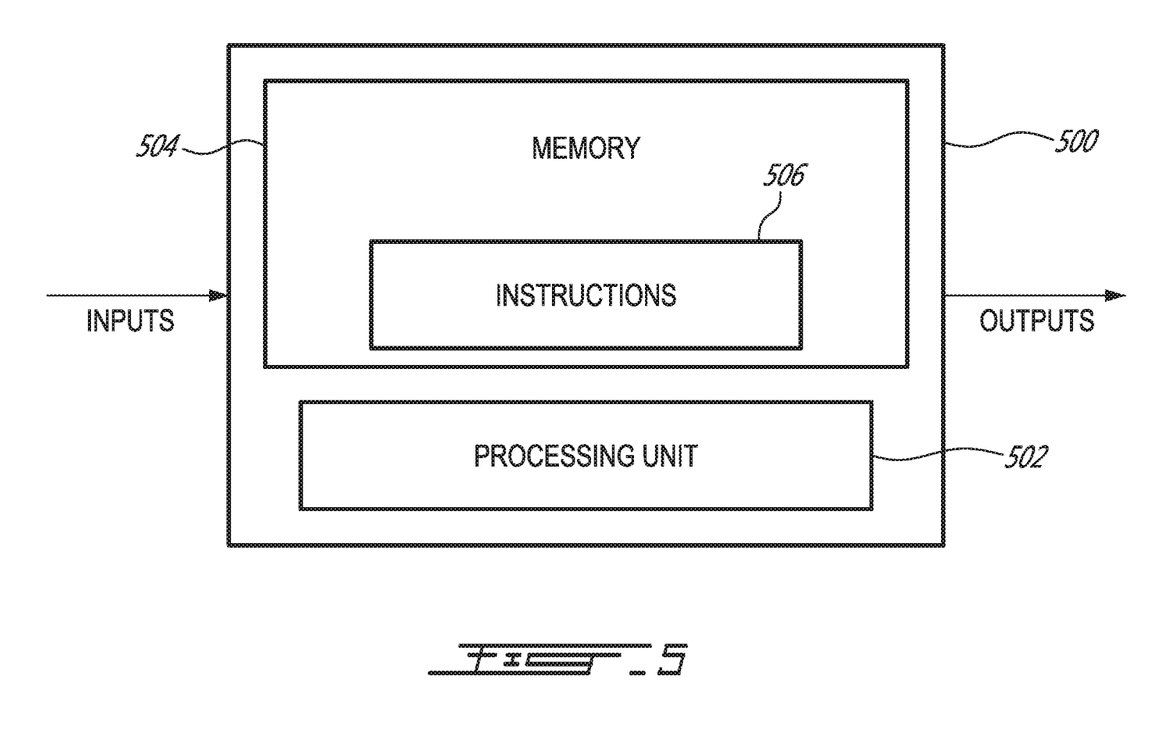
FIG. 5 is a block diagram of a computing device for implementing the fault detection system of FIG. 2, in accordance with an illustrative embodiment.

FIG. 5 is an example embodiment of a computing device 500 for implementing the fault detection system 102 described above. The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause the functions/acts/steps specified in the method described herein to be executed. The processing unit 502 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 406 executable by processing unit 502.

It should be noted that the computing device 500 may be implemented as part of a FADEC or other similar device, including an electronic engine control (EEC), engine control unit (EUC), engine electronic control system (EECS), and the like. In addition, it should be noted that the techniques described herein can be performed by a computing device 500 substantially in real-time.

Figure 6:
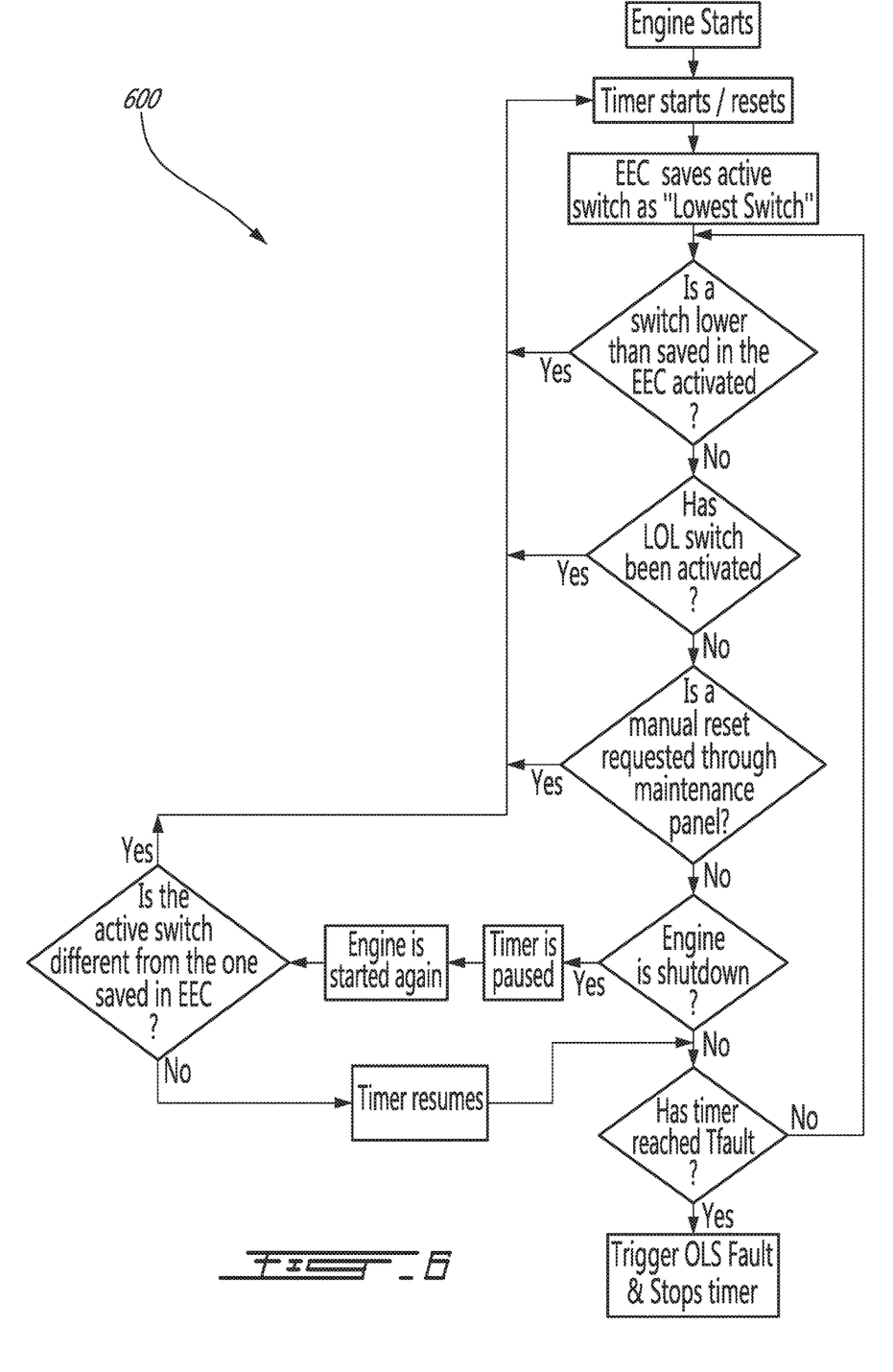
FIG. 6 is a flowchart of a fault detection method for a liquid level sensing device, in accordance with an illustrative embodiment.

FIG. 6 is a specific and non-limiting example of a method 600 as implemented by the computing device 500 for performing fault detection by the fault detection system 102. The engine starts, followed by the timer starting. The EEC 104 saves the active switch of the fluid level sensing device 106 as the "lowest switch". If a switch lower than the "lowest active switch" is activated, the timer is restarted. If the low-fluid level switch is activated, the timer is restarted. If a manual reset is requested through a maintenance panel, the timer is reset. If the engine is shutdown, the timer is paused. When the engine is restarted, if the active switch is higher than the "lowest switch" (i.e. associated with a higher fluid level), the timer is reset. Otherwise, the timer resumes. If none of the timer-reset conditions are met and the timer reaches the timer-threshold, a fault signal is output and the timer is stopped.

Although illustrated as sequentially, the steps of checking for the various timer-reset conditions may be performed concurrently. In addition, the order in which the steps of checking the various timer-reset conditions may differ from that illustrated in the method 600 of FIG. 6.

The methods and systems for detecting a fault of a fluid level sensing device as described herein may be implemented in a high level procedural or object oriented programming or scripting language, or a combination thereof, to communicate with or assist in the operation of a computer system, for example the computing device 500. Alternatively, the methods and systems for detecting a fault may be implemented in assembly or machine language. The language may be a compiled or interpreted language. Program code for implementing the methods and systems for detecting a fault may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting a fault may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for detecting a fault may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting a fault of a fluid level sensing device associated with an aircraft engine, the fluid level sensing device arranged to measure a variance in a fluid level, the method comprising:
triggering a timer;
while the timer is running, receiving a measurement indicative of the fluid level from the fluid level sensing device;
resetting the timer when at least one timer-reset condition has been met; and
outputting a fault signal when the timer reaches a timer threshold, wherein the timer threshold varies as a function of the measurement indicative of the fluid level.

2. The method of claim 1, wherein the at least one timer-reset condition comprises any one of the fluid level reaching a low fluid threshold and the fluid level decreasing by a predetermined amount.

3. The method of claim 2, wherein the at least one timer-reset condition comprises receiving a manual request to reset the timer.

4. The method of claim 2, wherein the low fluid threshold corresponds to a level of fluid consumable by the aircraft engine over a given time period, and the timer threshold is set to be less than the given time period.

5. The method of claim 1, further comprising pausing the timer when the aircraft engine is shutdown and resuming the timer when the aircraft engine restarts.

6. The method of claim 5, wherein the at least one timer-reset condition comprises detecting an increase in the fluid level between the aircraft engine shutdown and the aircraft engine restart.

7. The method of claim 1, wherein the fluid sensing device comprises a plurality of switches.

8. The method of claim 7, wherein the plurality of switches are reed switches and wherein the fluid level sensing device comprises a floating device configured to move vertically with the fluid level to activate and deactivate the reed switches.

9. The method of claim 7, further comprising determining a lowest active switch from the plurality of switches from the measurement indicative of the fluid level, and wherein the at least one timer-reset condition comprises a new lowest active switch being detected.

10. A system for detecting a fault of a fluid level sensing device associated with an aircraft engine, the fluid level sensing device arranged to measure a variance in a fluid level, the system comprising:
at least one processing unit; and
at least one non-transitory computer-readable memory having stored thereon program instructions executable by the at least one processing unit for:
triggering a timer;
while the timer is running, receiving a measurement indicative of the fluid level from the fluid level sensing device;

resetting the timer when at least one timer-reset condition has been met; and outputting a fault signal when the timer reaches a timer threshold, wherein the timer threshold varies as a function of the measurement indicative of the fluid level.

11. The system of claim 10, wherein the at least one timer-reset condition comprises any one of the fluid level reaching a low fluid threshold and the fluid level decreasing by a predetermined amount.

12. The system of claim 11, wherein the at least one timer-reset condition comprises receiving a manual request to reset the timer.

13. The system of claim 11, wherein the low fluid threshold corresponds to a level of fluid consumable by the aircraft over a given time period, and the timer threshold is set to be less than the given time period.

14. The system of claim 10, further comprising pausing the timer when the aircraft engine is shutdown and resuming the timer when the aircraft engine restarts.

15. The system of claim 14, wherein the at least one timer-reset condition comprises detecting an increase in the fluid level between the aircraft engine shutdown and the aircraft engine restart.

16. The system of claim 10, wherein the fluid sensing device comprises a plurality of switches.

17. The system of claim 16, wherein the plurality of switches are reed switches and wherein the fluid level sensing device comprises a floating device configured to move vertically with the fluid level to activate and deactivate the reed switches.

18. The system of claim 16, further comprising determining a lowest active switch from the plurality of switches from the measurement indicative of the fluid level, and wherein the at least one timer-reset condition comprises a new lowest active switch being detected.

19. A method for detecting a fault of a fluid level sensing device associated with an aircraft engine, the fluid level sensing device comprising a plurality of switches arranged to measure a variance in a fluid level, the method comprising:

triggering a timer;

while the timer is running, receiving a measurement indicative of the fluid level from the fluid level sensing device;

resetting the timer when at least one timer-reset condition has been met; and outputting a fault signal when the timer reaches a timer threshold.

20. A method for detecting a fault of a fluid level sensing device associated with an aircraft engine, the fluid level sensing device arranged to measure a variance in a fluid level, the method comprising:

triggering a timer;

while the timer is running, receiving a measurement indicative of the fluid level from the fluid level sensing device;

resetting the timer when at least one timer-reset condition has been met;

pausing the timer when the aircraft engine is shutdown and resuming the timer when the aircraft engine restarts; and outputting a fault signal when the timer reaches a timer threshold.

21. A method for detecting a fault of a fluid level sensing device associated with an aircraft engine, the fluid level sensing device arranged to measure a variance in a fluid level, the method comprising: triggering a timer; while the timer is running, receiving a measurement indicative of the fluid level from the fluid level sensing device; resetting the timer when at least one timer-reset condition has been met, wherein the at least one timer-reset condition comprises any one of the fluid level reaching a low fluid threshold and the fluid level decreasing by a predetermined amount, and wherein the low fluid threshold corresponds to a level of fluid consumable by the aircraft engine over a given time period and a timer threshold is set to be less than the given time period; and outputting a fault signal when the timer reaches the timer threshold.

* * * * *